UNITED STATES PATENT OFFICE.

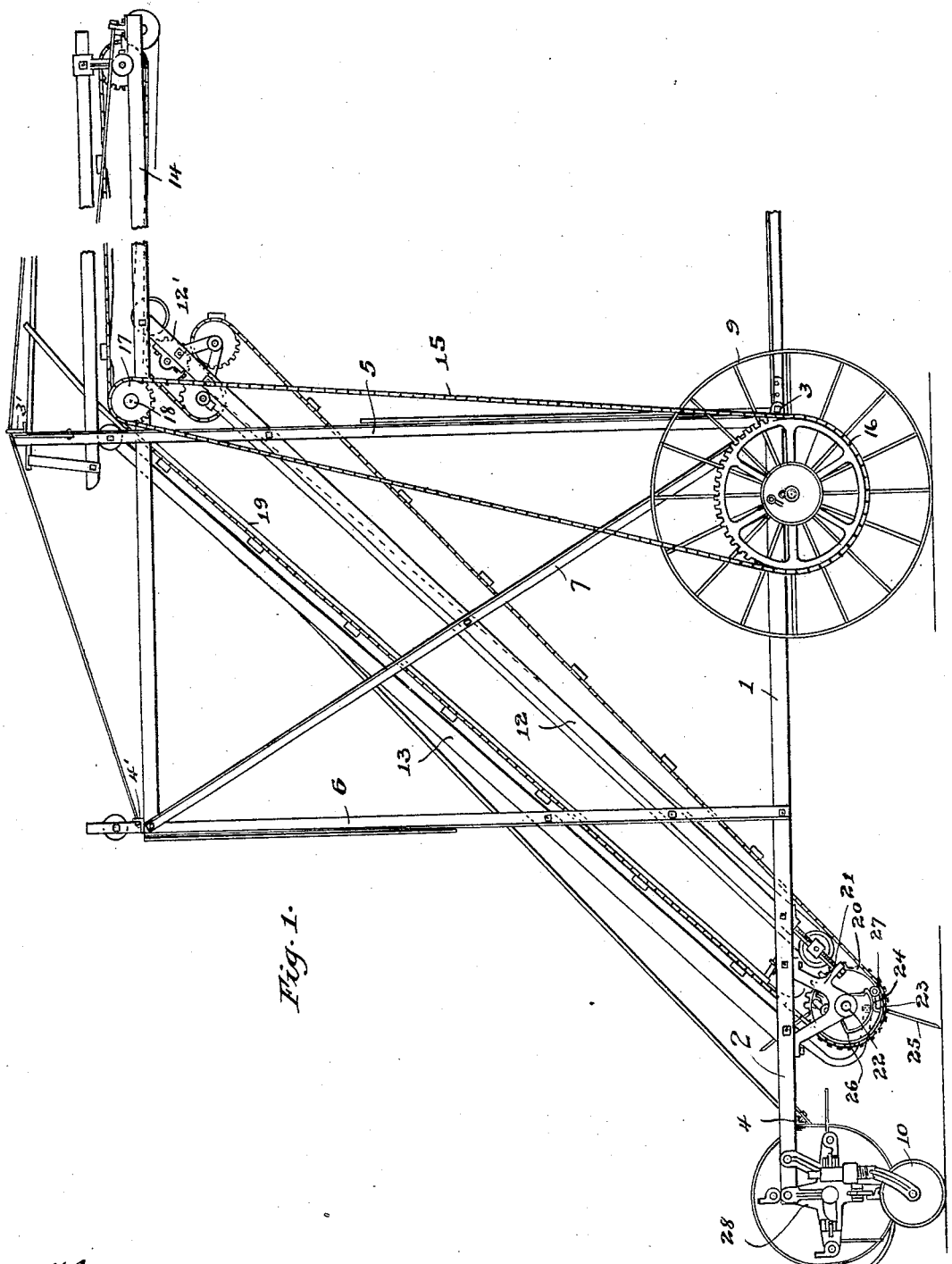

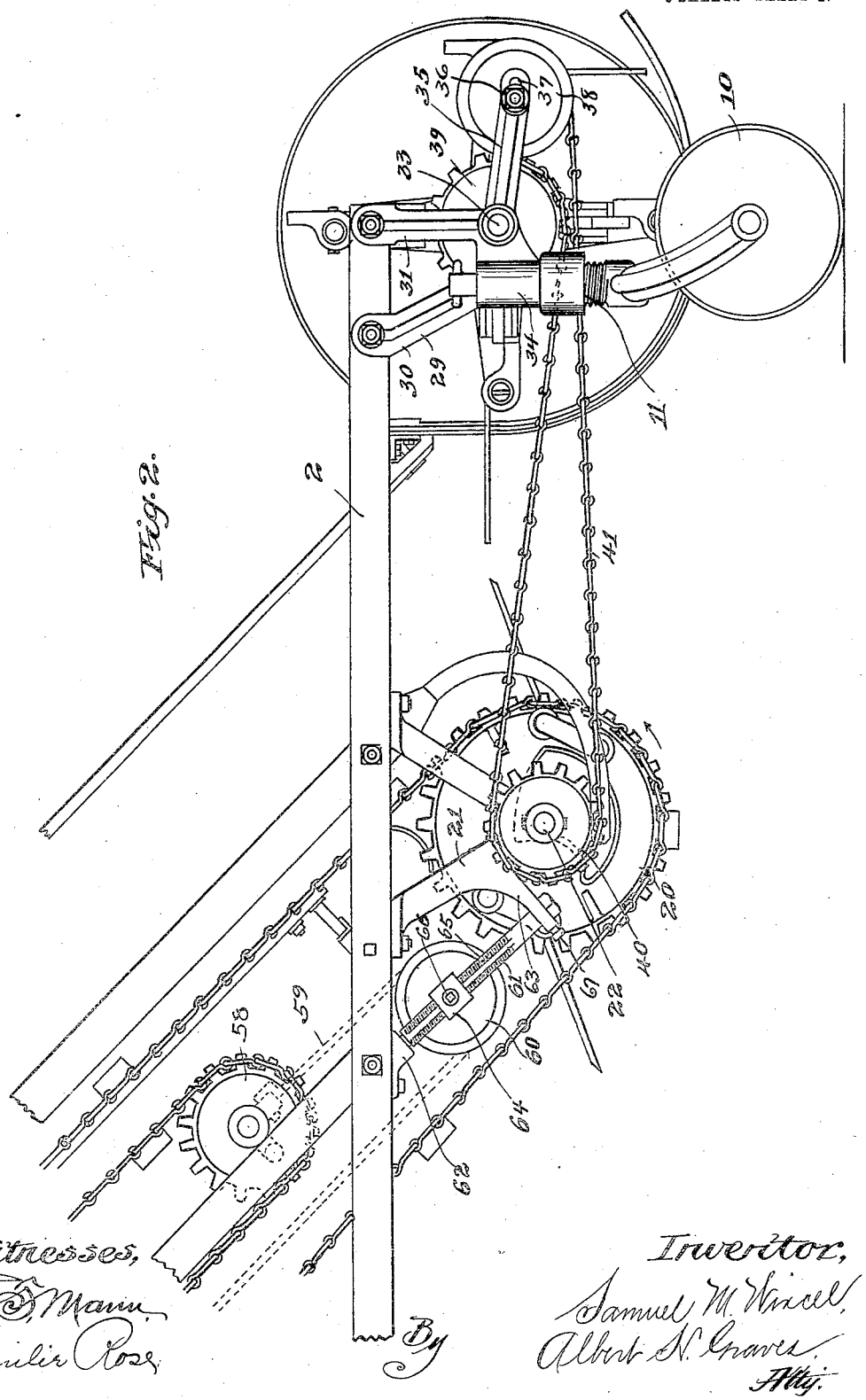

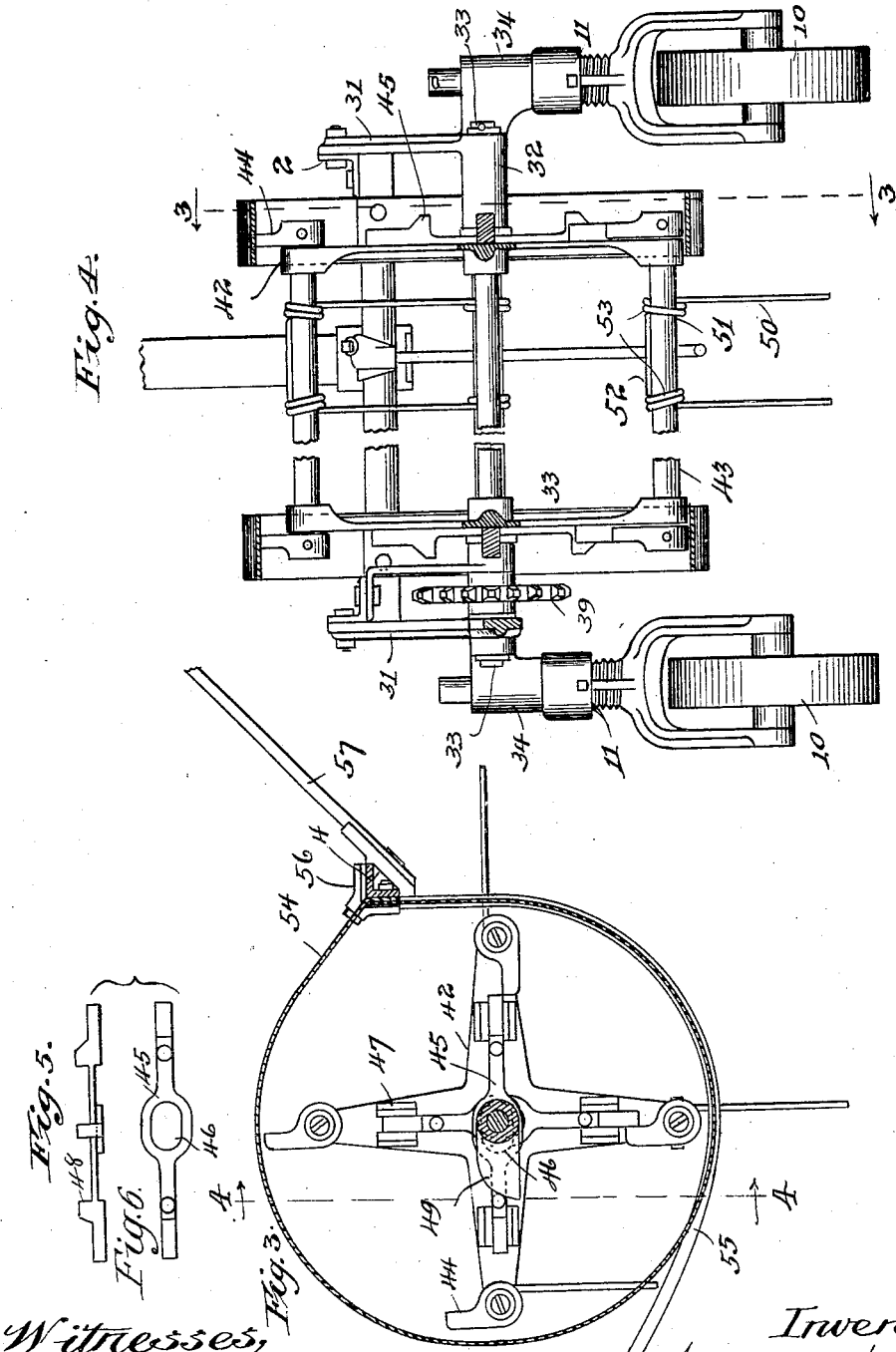

SAMUEL M. WIXCEL, OF SIOUX CITY, IOWA.

HAY-LOADER.

No. 931,109.  Specification of Letters Patent.  Patented Aug. 17, 1909.

Application filed March 26, 1906. Serial No. 308,160.

*To all whom it may concern:*

Be it known that I, SAMUEL M. WIXCEL, a citizen of the United States, residing at Sioux City, in the county of Woodbury and State of Iowa, have invented certain new and useful Improvements in Hay-Loaders, of which the following is a specification.

This invention relates to improvements in hay loaders of that type which are adapted to be drawn behind the vehicle to be loaded and serve to gather the hay either from the swath or windrow and elevate it to the wagon.

Among the salient objects of the invention are to provide a loader in which a rotary gathering rake mechanism is arranged in opposed relation to, and coöperates with, a rotary pick-up mechanism, in bringing the hay within the sphere of action of the carrier; to provide a rotary gathering rake mechanism in which the direction of rotation is forwardly and upwardly as to its lower side which lifts the hay, and the teeth or gathering fingers are automatically tripped as they successively rise at the point in their rotation at which they have completed their gathering and lifting function; to provide in a construction of the character last referred to simple and improved means for locking the teeth in their operative positions and for effecting their release or tripping, without the aid of springs or complicated or unreliable mechanism; to provide improvements in the arrangement and manner of supporting the gathering rake mechanism whereby it is caused to follow uneven places on the ground with great fidelity and corresponding efficiency in gathering the hay; to provide improved means for tensioning the endless carrier or elevator belt; to provide an improved construction and arrangement of stripper fingers coöperating with the gathering rake mechanism; to provide in conjunction with the stripper fingers a set of compressor slats which are arranged in such relation to the stripper fingers that they receive the hay from the latter and coöperate in the function of guiding it within the sphere of action of the elevator; to provide in conjunction with the mechanism which effects the locking and tripping or unlocking of the gathering fingers and a guard arranged to encircle said mechanism and prevent its becoming clogged; and in general to provide improvements in the construction and arrangement of a machine of the character referred to.

To the above ends the invention consists in the matters hereinafter described and more particularly pointed out in the appended claims.

The invention will be readily understood from the following description, reference being had to the accompanying drawings, in which—

Figure 1 is a general view, showing in side elevation a machine embodying my invention, parts of the horizontal carrier being broken out to reduce the size of the figure; Fig. 2 is a detail showing in side elevation and on a larger scale the lower part of the pick-up and elevator mechanism and coöperating gathering rake; this view showing that side of the machine opposite that shown in Fig. 1; Fig. 3 is a sectional view taken on line 3—3 of Fig. 4 and looking in the direction of the arrows; Fig. 4 is a vertical sectional view taken substantially on line 4—4 of Fig. 3 and looking in the direction of the arrows; Fig. 5 is a detail in edge elevation of a pair of the shiftable locking bars arranged in their proper intersecting relation; Fig. 6 is a plan view of one of the bars.

The machine embodying my present invention is in general similar to a machine heretofore patented to me, Patent No. 809,598, issued January 9, 1906, and as to specific details of construction forming no part of the present invention, reference may be had thereto. In said former machine the pick-up mechanism was arranged to coöperate with a stationary spring tooth rake, while in the present machine the pick-up mechanism is arranged to coöperate with a rotary gathering rake mechanism supported just in rear of the pick-up mechanism and rotating in the proper direction to lift the hay upwardly and forwardly; these two mechanisms serving to effectually carry the hay into the sphere of action of the elevator mechanism.

Referring to the drawings, 1 designates as a whole a main wheel supported frame comprising side frame members 2, front and rear cross frame members 3 and 4, respectively, upper cross frame members 3′ and 4′, upright members 5 and 6 at each side of the machine, and diagonal brace members 7 at each side. Beneath the forward part of the main supporting frame is secured the main supporting axle 8, provided with suitable supporting wheels 9 at each end, while the rear end of the main frame is supported by means of a pair of caster wheels 10 adjustably connected with the frame so that the latter may be raised or lowered, as indicated at 11 (see Fig. 2).

12 and 13 designate side frame members arranged at each side of the machine to extend obliquely upward from the corresponding frame members 2 to the upper portion of the uprights 5; the members 12 being extended beyond their intersection with the uprights 5 to form bracket portions 12' which engage and support horizontal side frame members 14. Upon the frame structure thus formed is mounted and supported a carrier mechanism which travels over both the inclined upwardly extending frame and the horizontal forwardly extending extension thereof, as fully described in my previous patent.

In the present machine, as in the patent referred to, a chain belt 15 engaged with a sprocket 16 on one of the main supporting wheels and with a second sprocket 17 mounted upon an upper cross shaft 18 and carrying suitable belt sprockets, actuated the upper lap of the carrier 19. The respective sides of this carrier in turn are trained around and rotate sprockets 20 at each side of the machine, forming parts of a rotary pick-up mechanism now to be described. This pick-up mechanism comprises a pair of brackets 21 mounted upon the corresponding frame members 2, a shaft 22 journaled in and extending through said brackets, and upon which the respective sprockets 20 are rigidly mounted, a series of oscillatory pick-up finger shafts 23 arranged to extend through the peripheral portions of the sprockets 21 parallel with each other and each provided with crank projections 24, pick-up fingers 25 carried by said shafts 23, and cam segments 26 rigid with the respective brackets 21 and coöperating with the cranks of the pick-up finger shafts to impart a peculiar oscillatory movement to said fingers. The construction and operation of this mechanism are in general like that of the patent referred to, but may be briefly described as follows: The end of each crank 24 is provided with an antifriction cam roller 27, and the peripheries of the cams 26 are so shaped that as the pick-up finger shafts are carried around with the sprockets 20, the engagement of the cam rollers 27 with the corresponding cams 26 holds the pick-up fingers in approximately radial relation to the axis of the pick-up drum as a whole during their travel through the lower part of their rotation and until they have been carried upwardly nearly to a horizontal position whereupon they gradually change their angle, the points of the fingers swinging backwardly relatively to the direction of rotation of the pick-up drum and passing out of engagement with the hay which has not been carried on to the carrier.

28 designates as a whole a rotary gathering rake mechanism, which is supported with its axis in vertical register with the axis of the caster wheels 10 hereinbefore referred to. Describing said mechanism, and referring to Figs. 2 and 4, 29 designates brackets which are rigidly mounted upon the rear ends of the side frame members 2; each bracket comprising a pair of arms 30 and 31 connected with the corresponding side frame member 2, a hub portion 32 through which the center shaft 33 of the gathering rake mechanism extends and an upright socket portion 34 which receives the stem of the corresponding caster wheel yoke. The gathering rake mechanism is driven from one side only, as seen in Fig. 4, and accordingly at that side of the machine, the bracket 29 is provided with an additional arm 35, extending rearwardly and carrying at its end a stud shaft 36 adjustably mounted in a slot 37. Upon this stud shaft is journaled an idler pulley 38. The hub portion 32 of the bracket is at this side of the machine made shorter, and the sprocket wheel 39 is keyed upon the shaft 33 adjacent to said hub, as seen clearly in Fig. 4; this sprocket 39 being in the same plane with the idler pulley 38. Upon the same side of the machine, upon the shaft 22 and rigidly connected with the corresponding sprocket 20, is a drive sprocket 40, which is operatively connected with the sprocket 39 by means of a belt 41; this belt being trained around the idler 38 and the lower side of the sprocket 39 only, so as to drive the gathering rake in a direction the reverse of that of the pick-up head.

Describing now more particularly the construction of the rake-head, upon the shaft 33, which forms the axis of the head and extends to, and is journaled within, the respective caster brackets are mounted two spiders 42, one at each end of the head and, through the ends of the spider arms are arranged to extend a series of parallel rocker bars 43 spaced at equal angular distances apart. Each rocker bar is journaled to oscillate in the corresponding spider arms and upon each end of each rocket bar, outside of the spider, is rigidly secured a controlling dog 44. With each diametrically opposed pair of controlling dogs is arranged to coöperate a shiftable locking bar 45; there being in the present instance four rocking bars and accordingly two locking bars at each end of the rake head.

Referring to Figs. 5 and 6, one of these locking bars is shown in detail. As will be seen by reference to said figures, each locking bar is provided with a centrally elongated slot 46 which fits over the main shaft 33 of the rake head, and at points between said slots and each end it is arranged to work through guides 47 (see Fig. 3) formed upon the spider arms. Each locking bar is provided with a pair of cam studs 48 located at equal distances from its center and adapted to coöperate with a fixed cam projection 49 carried by the caster wheel bracket; the surface of said cam projections with which said stud coöperate being curved eccentrically with relation to the axis of the rake head. The cam projection 49 extends rearwardly in an approximately horizontal direction and its eccentrically curved surface extends outwardly and downwardly, so that as each locking bar is carried past the cam projection it is shifted endwise and rearwardly.

As hereinbefore stated each rocker bar 43 carries a series of rake teeth, which rake teeth are preferably of the spring variety, and preferably also formed in integral pairs. To this end each tooth 50 is provided with a coil 51 arranged to encircle the corresponding rocker bar and the coils of each adjacent pair of teeth are united integrally by a bail 52, the ends of which are extended diametrically through the rocker bar, as indicated at 53. The teeth of the respective rocker bars are arranged to extend substantially parallel with but oppositely from the corresponding controlling dogs 44, as seen clearly in Fig. 3. It follows, from the construction described, that the several series of teeth tend to swing by gravity into vertical position. As each series of teeth descends and encounters the hay or stubble the rocker bar carrying them is oscillated in a direction to bring the projecting end of the controlling dog into engagement with that end of the corresponding locking bar 45 which has just been shifted toward said dog by passing the cam projection 49. When the controlling dog encounters the locking bar the teeth become rigid with the rake head, and are in this condition carried forwardly until they reach a horizontal position at the front of the rake head, at which point the locking bar is again shifted thus tripping the controlling dog and permitting the teeth to withdraw naturally and freely from the mass of hay in the further rotation of the head.

In order to protect each controlling mechanism from becoming clogged by the hay, it is surrounded by a band-like guard 54 which has its ends rigidly attached to the cross frame member 4, as shown clearly in Fig. 3. In order to prevent the hay from being wedged in between the rocker bars, and also to insure the stripping of the hay from the rake teeth during their upward travel, a series of stripper fingers 55 is also mounted upon the cross frame member 4, there being preferably one such finger between each pair of teeth, as best seen in Fig. 4. These stripper fingers are conveniently made rigid with the angular cross frame member 4 by means of angle castings 56, and a series of compressor slats 57 are likewise connected with the cross frame member 4 and arranged to extend obliquely upwardly in proximity to the upper side of the elevator. Preferably the compresser slots and stripping fingers are arranged in alinement with each other, as seen in Fig. 4. It will be noted that the relative arrangement of the pick-up head and rake head is such that the ends of the fingers and teeth of these respective mechanisms closely approach each other just at the throat entrance to the elevator, i. e. just at that point where the hay passes onto the upwardly inclined carrier and beneath the compresser slots. It is further to be noted that the axes of the caster wheels 10 and the axis of the rake head are in vertical alinement, from which it follows that the rake teeth will follow the irregularities and undulations of the ground exactly with the rise and fall of the caster wheels. This insures the greatest efficiency in raking clean and also prevents the rake teeth from being jammed into the earth, as commonly occurs when the supporting wheels or casters are set out of vertical alinement with the rake head.

In the machine of my previous patent, and in the present machine, a loop of the main carrier doubles back between the upper and lower laps thereof, and is carried by a pair of reciprocating sprockets which travel bodily up and down the carrier as the loop is paid out or drawn back. In Figs. 1 and 2 of the drawings these bodily movable sprockets are designated 58 and a pair of tension cables 59 connected with the supporting shaft of these sprockets and trained thence around lower guide pulleys 60 to serve to keep the carrier belt taut.

In the present machine the pair of pulleys 60 are made to serve also as tension pulleys in addition to their function of guide pulleys. To this end said pulleys are each mounted upon a threaded shaft 61 which is swiveled to rotate in bearings 62 and 63; the latter bearing being formed as an extension of the bracket 21 hereinbefore described. Each pulley 60 is journaled on a gudgeon stud 64 which has a threaded eye through which the shaft 61 extends, and which shaft 61 is flattened or grooved along one side, as indicated at 65, and a set screw 66, threaded through the end of the gudgeon stud, arranged to impinge against said flattened portion and thus lock the gudgeon stud in adjusted relation. In order to lock the shaft 61 against bodily rotation a set screw 67 is inserted through the bearing support 63 and also impinges against the shaft.

The operation of those features of the loader which constitute the present invention has been fully set forth in connection with the description of the mechanism, and need not therefore be repeated. It may be noted, however, that the pick-up mechanism and the rotary rake mechanism coöperate most effectively in gathering up and delivering the hay to the carrier. In passing over the hay the pick-up fingers gather and elevate the greater part of the swath or windrow, particularly where the hay is heavy. Any tendency of the hay to slip from the pick-up fingers and fall off rearwardly is counteracted by the constant forward and upward movement of the rake teeth.

While I have herein set forth and described what I deem to be a preferred embodiment of the invention, yet it will be obvious that details of construction may be modified without departing from the spirit of the invention.

I claim as my invention:

1. In a hay loader, the combination with a wheeled main frame, a hay carrier mounted to operate thereon, a rotary pick up mechanism at the foot of said hay carrier, a rotary rake following said pick up mechanism and driven in a direction to sweep the hay forwardly and upwardly, and caster wheels mounted adjacent to said rotary rake and having their axes of rotation approximately vertically coincident with the axis of rotation of the rake.

2. In a hay loader, the combination with a wheeled main frame, a hay carrier mounted to operate thereon, a rotary pick up mechanism at the foot of said hay carrier, a rotary rake following said pick up mechanism and driven in a direction to sweep the hay forwardly and upwardly, and caster wheels mounted adjacent to said rotary rake.

3. In a hay gathering mechanism, a rotary rake comprising a rake head having a plurality of transversely disposed and circumferentially separated rock bars, each carrying a series of rake teeth, a locking member carried by and rigid with each rock bar, a coöperating endwise shiftable locking member mounted to move bodily with the movement of rotation of the rake head, and means operating automatically to shift said shiftable locking member into and out of locking position during each rotation of the rake head.

4. In a hay gathering mechanism, a rotary rake comprising a rake head having a plurality of transversely disposed circumferentially separated rock bars mounted to oscillate freely in their bearings and each carrying a series of rake teeth, a locking member carried by and rigid with each rock bar, coöperating endwise shiftable locking members mounted to move bodily with the movements of rotation of the rake head, and means operating automatically to shift said locking members into and out of locking positions during each rotation of the rake head, whereby the series of teeth carried by each rocking bar are locked rigid against rearward movement relatively to the direction of rotation of said rake head during one part of its revolution and are set free to swing pendulously during the remainder of the revolution of the rake head.

5. In a hay gathering mechanism, a rotary rake comprising a rake head provided with a plurality of transversely extending circumferentially separated rock bars, each carrying a series of rake teeth, said rock bars being arranged in diametrically opposite pairs, a locking member carried by each rock bar, a coöperating shiftable locking member mounted to rotate bodily with the rake head and extending diametrically across the latter so that each end thereof coöperates with a corresponding rock bar, and means operating automatically to effect the endwise shifting of said locking members in each direction during each rotation of the rake head.

6. In a hay gathering mechanism, a rotary rake comprising a rake head provided with a plurality of transversely extending circumferentially separated rock bars, each carrying a series of rake teeth, said rock bars being arranged in diametrically opposite pairs, a locking member carried by each rock bar, a coöperating shiftable locking member mounted to rotate bodily with the rake head and extending diametrically across the latter so that each end thereof coöperates with a corresponding rock bar, and means operating automatically to effect the endwise shifting of said locking members in each direction during each rotation of the rake head comprising a cam projection immovably mounted in the plane of rotation of said shiftable locking members, and a pair of coöperative cam projections upon each locking bar located equi-distant from the center thereof.

7. In a hay gathering mechanism, the combination with a main frame of a rotary rake mounted thereon comprising a plurality of transversely extending circumferentially separated rock bars each carrying a series of rake teeth, a locking member carried by each rock bar, a coöperating endwise shiftable locking member mounted to move bodily with the rake head, means operating automatically to actuate said shiftable locking member, and a guard secured to said main frame and extending circumferentially around said rock bar controlling mechanism to its place of attachment to said frame, said guard consisting of a band-like member of a width greater than the width of the movable parts of said controlling mechanism and arranged to project outside of the two planes between which said controlling mechanism is comprised.

8. In a hay loader, the combination with a wheeled main frame and a hay carrier operating thereon, of a pick-up rake at the foot of the carrier, a rotary rake following said pick-up rake and rotated in a direction the reverse of the rotation of the latter, said rotary rake comprising a series of rake teeth mounted to oscillate during the bodily rotation of the rotary rake head, means for locking the teeth against oscillation during a part of the rotation of the rake head, means for tripping the teeth and permitting them to move pendulously during the remainder of the movement of the rake head, a set of stripping fingers arranged to extend partly around the rake head between the rake teeth registering with that part of the revolution of the rake head during which the teeth are held rigid, and a series of compressor slats extending in continuation of said stripping fingers upwardly upon the hay carrier.

9. In a hay loader, the combination of a wheeled main frame, a hay carrier mounted to operate thereon, a rotary pick-up mechanism at the foot of said hay carrier, a rotary rake following said pick-up mechanism and driven to rotate in a direction to sweep the hay forwardly and upwardly, and means supporting the rear end of said main frame and the mechanism carried thereby comprising a pair of caster wheels mounted upon the main frame at opposite ends of said rotary rake and having their axes of rotation vertically coincident with the axis of rotation of the rake, or substantially so.

10. In a hay loader, the combination of a wheeled main frame, a hay carrier mounted to operate thereon, a rotary pick-up mechanism at the foot of said hay carrier, a rotary rake following said pick-up mechanism and driven to rotate in a direction to sweep the hay forwardly and upwardly, and means supporting the rear end of said main frame and the mechanism carried thereby comprising a pair of caster wheels mounted upon the main frame at opposite ends of said rotary rake and having their axes of rotation vertically coincident with the axis of rotation of the rake, or substantially so, and means for adjustably raising and lowering the rear end of said main frame upon said caster wheels.

11. In a hay loader, the combination with a wheeled main frame, a hay carrier mounted to operate thereon, a rotary pick-up mechanism at the foot of said hay carrier, a rotary rake following said pick-up mechanism and driven to rotate in a direction to sweep the hay forwardly and upwardly, and means supporting the rear end of said frame comprising caster wheels mounted upon said main frame adjacent to said rotary rake.

SAMUEL M. WIXCEL.

Witnesses:
 EMILIE ROSE,
 FRANK G. BELKNAP.